United States Patent [19]
Yoshida et al.

[11] Patent Number: 5,925,995
[45] Date of Patent: Jul. 20, 1999

[54] ELECTRIC POWER STEERING APPARATUS

[75] Inventors: Kazuyuki Yoshida, Sakurai; Mitsuhiko Nishimoto, Kashihara, both of Japan

[73] Assignee: Koyo Seiko Co. Ltd., Osaka, Japan

[21] Appl. No.: 09/154,559

[22] Filed: Sep. 16, 1998

[30] Foreign Application Priority Data

Sep. 17, 1997 [JP] Japan ................................. 9-252513

[51] Int. Cl.$^6$ ................................................ H02K 17/32
[52] U.S. Cl. ........................... 318/434; 318/471; 318/476
[58] Field of Search .................................... 318/434, 471, 318/476

[56] References Cited

U.S. PATENT DOCUMENTS 4,986,379  1/1991  Morishita ........................ 318/434 X

*Primary Examiner*—Karen Masih
*Attorney, Agent, or Firm*—Darby & Darby

[57] ABSTRACT

In an electric power steering apparatus, it is judged whether or not a value of primary delay of temperature increase in a driving circuit for an electric motor tends to decrease, and when the value of primary delay is judged to tend to decrease, a new value of primary delay is obtained with a time constant set smaller, so that an upper limit value of a motor current can be decided on the basis of the new value of primary delay. Thus, a steering power can be rapidly recovered.

7 Claims, 5 Drawing Sheets

ELECTRIC POWER STEERING APPARATUS

BACKGROUND OF THE INVENTION

The present invention relates to an electric power steering apparatus for an automobile, and more particularly, it relates to overheat protection of an electric motor for assisting a steering force.

A conventional electric power steering apparatus in which an electric motor is used as means for assisting a steering force has a configuration, for example, as is shown in a block diagram of FIG. 1. In this electric power steering apparatus, a torque sensor 1 provided on a steering shaft detects torque applied thereto, a vehicle speed sensor 2 detects a vehicle speed, and data detected by these sensors are input to a microprocessor 3. On the basis of the information supplied by the sensors 1 and 2, an assist characteristic deciding section 31 decides a current component for driving an electric motor 5 so as to cancel the detected torque. An inertia control characteristic deciding section 32 decides, also on the basis of the information supplied by the sensors 1 and 2, a current component for driving the electric motor 5 so as to cancel the inertia of the electric motor 5.

The value of the current component decided by the assist characteristic deciding section 31 is input to a protecting section 36, and the protecting section 36 decides an upper limit value and outputs the upper limit value to an adder 37. The value of the current component decided by the inertia control characteristic deciding section 32 is directly input to the adder 37, and the adder 37 obtains a sum of these values. The sum is then input to a subtracter 38.

A driving current for the electric motor 5 for assisting a steering force is detected by a current detecting element 6 and the thus detected value is supplied to the microprocessor 3. This data is also supplied to the subtracter 38 as feedback data and to the protecting section 36 to be used for determining the upper limit value.

A difference, that is, the output of the subtracter 38, is input to a motor driving circuit 4, so that the electric motor 5 can be driven by a PWM wave in accordance with the difference.

The upper limit value of the driving current for the electric motor 5 determined by the protecting section 36 is defined, for example, as is shown in FIG. 2. In FIG. 2, the abscissa indicates an integrated value of the driving current (overload protection integrated value), namely, (driving current)$^2$/(1+ Ts), wherein s indicates a Laplacean and T indicates a time constant depending upon a temperature increase characteristic of a transistor of the motor driving circuit. For example, T is equal to 16384 seconds. The ordinate indicates the upper limit value.

The integrated value indicates a value of primary delay corresponding to temperature increase caused by an exothermic amount expressed by a square of the current and the accompanied heat radiation amount, and simulates the temperature increase characteristic of the transistor of the motor driving circuit 4. As is obvious from FIG. 2, when the integrated value exceeds a predetermined value, $(3.7)^2$/(1+ Ts), the upper limit value is decreased from 60A, that is, a rated value.

Now, the operation of the protecting section 36 for determining the upper limit value of the driving current for the electric motor 5 will be described with reference to a flowchart for showing the operation shown in FIG. 3.

First, the protecting section 36 reads a current value detected by the current detecting element 6 (step S1), and calculates a square of the detected current value (step S3). Then, the square of this detected current value is added to an overload protection integrated value obtained in previous sampling, and the sum obtained through this addition is stored in a working RAM 1 (step S5).

Next, the protecting section 36 divides the content of the working RAM 1 by the time constant T, multiplies the obtained quotient by a sampling cycle (for example, 0.5 second), and stores the obtained product, as a value of primary delay, in a working RAM 2 (step S7).

Subsequently, the protecting section 36 subtracts the content of the working RAM 2 from the content of the working RAM 1, and defines the obtained difference as an overload protection integrated value (step S9). Then, on the basis of the thus obtained overload protection integrated value, the protecting section 36 determines the upper limit value of the motor current based on a table (not shown) listing the characteristic as is shown in FIG. 2 (step S11).

As described above, in the conventional electric power steering apparatus, the value of primary delay of the temperature increase in the motor driving circuit is obtained on the basis of a square of the motor driving current, and the upper limit of the driving current is determined on the basis of the obtained value of primary delay. Thus, the overheat protection of the motor driving circuit is performed. However, in the case where the time constant used for calculating the value of primary delay is set at a large value with priority given to sufficient overload protection, even when it is necessary to increase the upper limit of the driving current in response to the decrease of the motor driving current, the recovery increase of the upper limit value can be delayed. As a result, the driving current is suppressed for a long period of time, and the steering force is disadvantageously continuously insufficient.

BRIEF SUMMARY OF THE INVENTION

The present invention was devised to overcome the aforementioned problems, and the object of the invention is providing an electric power steering apparatus in which an upper limit value of a motor current decreased for overheat protection of a motor driving circuit can be rapidly increased, so that a steering power can be rapidly recovered.

The electric power steering apparatus of this invention comprises a motor driving circuit for driving an electric motor for assisting a steering power; a detecting element for detecting a driving current for the electric motor; and an overheat protecting means for deciding an allowable upper limit value of the driving current for the electric motor on the basis of the detected driving current, and the overheat protecting means includes means for calculating a square of the detected driving current; means for obtaining a value of primary delay of temperature increase in the motor driving circuit on the basis of the calculated square and a set time constant; increase/decrease judging means for judging whether or not the obtained value of primary delay tends to decrease; means for obtaining, when the increase/decrease judging means judges that the value of primary delay tends to decrease, a new value of primary delay with the time constant set at a smaller value than when it is not judged that the value of primary delay tends to decrease; and means for deciding the allowable upper limit value of the driving current for the electric motor on the basis of the obtained new value of primary delay.

In one aspect of the electric power steering apparatus, the increase/decrease judging means compares the square of the detected driving current value with the value of primary delay and judges that the value of primary delay tends to decrease when the square is smaller than the value of primary delay.

In another aspect of the electric power steering apparatus, the value of primary delay is obtained by dividing a sum of an integrated value of the detected driving current and the square of the detected driving current by the set time constant.

In still another aspect of the electric power steering apparatus, the overheat protecting means decides the allowable upper limit value of the driving current for the electric motor on the basis of a value obtained by subtracting the value of primary delay from a sum of an integrated value of the detected driving current and the square of the detected driving current.

Accordingly, in the present electric power steering apparatus, the increase/decrease judging means for judging whether or not the value of primary delay of the temperature increase in the driving circuit for the electric motor tends to decrease makes judgement, so that the time constant used for calculating the value of primary delay can be set at a smaller value when the value of primary delay is judged to tend to decrease. As a result, the upper limit value of the motor current, which is decreased in accordance with the increase of the value of primary delay, can be rapidly increased when the value of primary delay tends to decrease, and hence, a steering power can be rapidly recovered.

The above and further objects and features of the invention will more fully be apparent from the following detailed description with accompanying drawings.

DETAILED DESCRIPTION OF THE INVENTION

A preferred embodiment of the invention will now be described with reference to the accompanying drawings.

Figure 4:
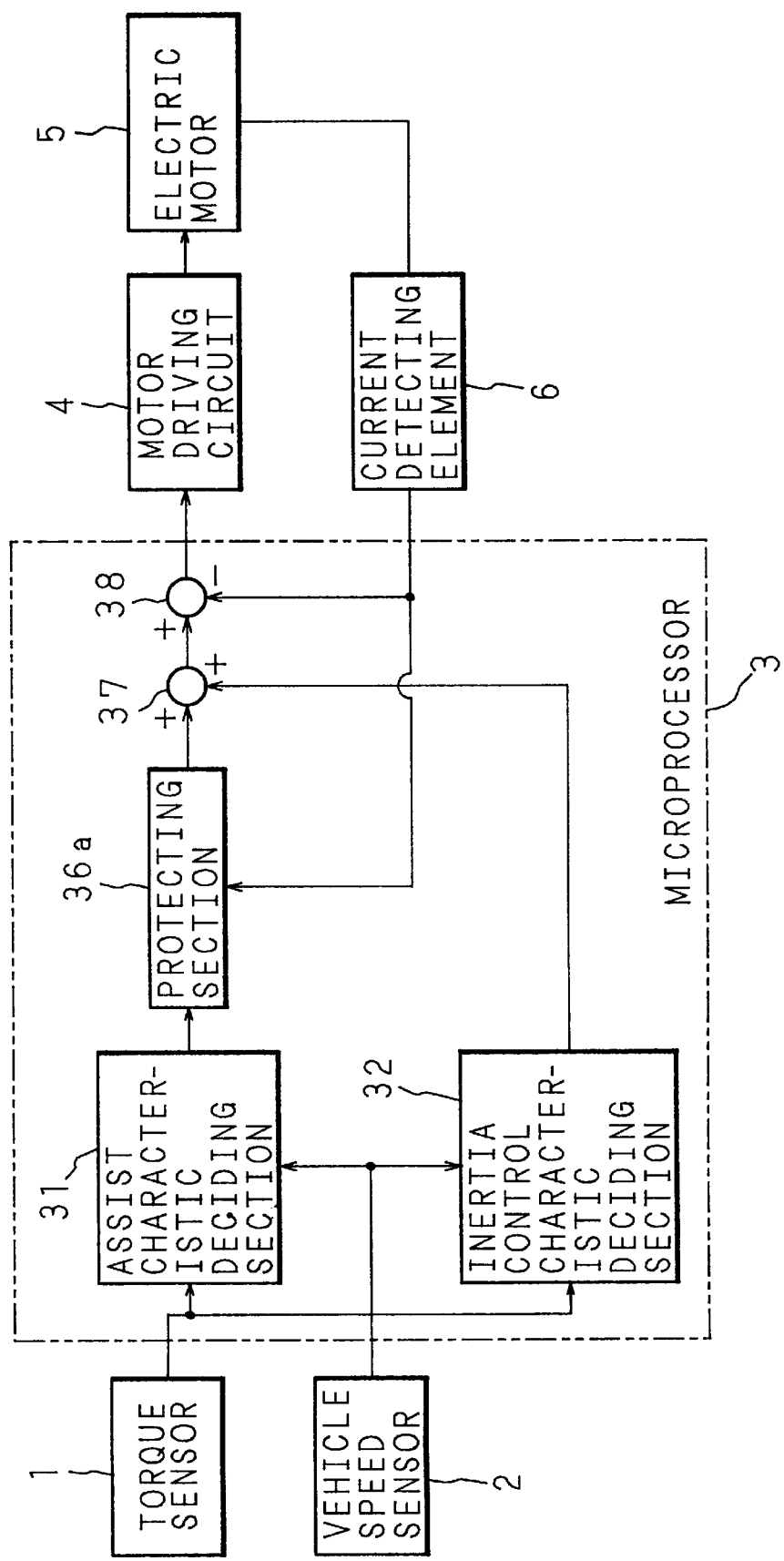
FIG. 4 is a block diagram for showing the configuration of an electric power steering apparatus according to the invention.

FIG. 4 is a block diagram for showing the configuration of an electric power steering apparatus according to the invention. In this electric power steering apparatus, a torque sensor 1 provided on a steering shaft detects torque applied thereto, a vehicle speed sensor 2 detects a vehicle speed, and the data detected by these sensors are input to a microprocessor 3.

On the basis of the information supplied from the sensors 1 and 2, an assist characteristic deciding section 31 decides a current component for driving an electric motor 5 so as to cancel the detected torque. An inertia control characteristic deciding section 32 decides, also on the basis of the information supplied from the sensors 1 and 2, a current component for driving the electric motor 5 so as to cancel the inertia of the electric motor 5.

The value of the current component decided by the assist characteristic deciding section 31 is input to a protecting section 36a, and the protecting section 36a determines an upper limit value and outputs the upper limit value to an adder 37. The value of the current component decided by the inertia control characteristic deciding section 32 is directly input to the adder 37. The adder 37 obtains a sum of these values, and the sum is input to a subtracter 38.

A driving current for the electric motor for assisting a steering power is detected by a current detecting element 6 and the detected current is supplied to the microprocessor 3. This data is also supplied to the subtracter 38 as feedback data and to the protecting section 36a to be used for determining the upper limit value.

A difference, that is, the output of the subtracter 38, is input to a motor driving circuit 4, and the electric motor 5 is driven by a PWM wave in accordance with the difference.

Figure 1:
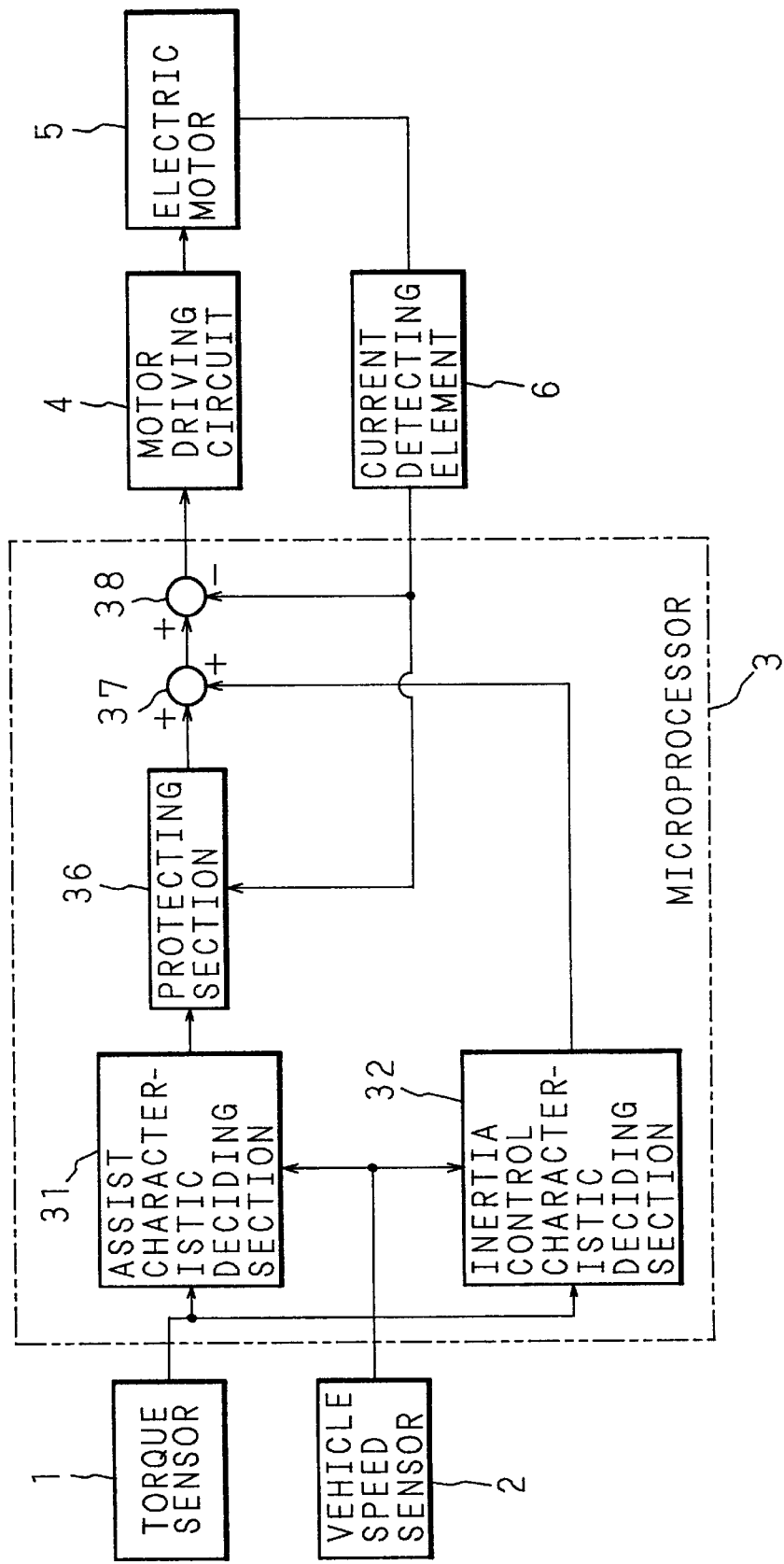
FIG. 1 is a block diagram for showing the configuration of a conventional electric power steering apparatus.
Figure 2:
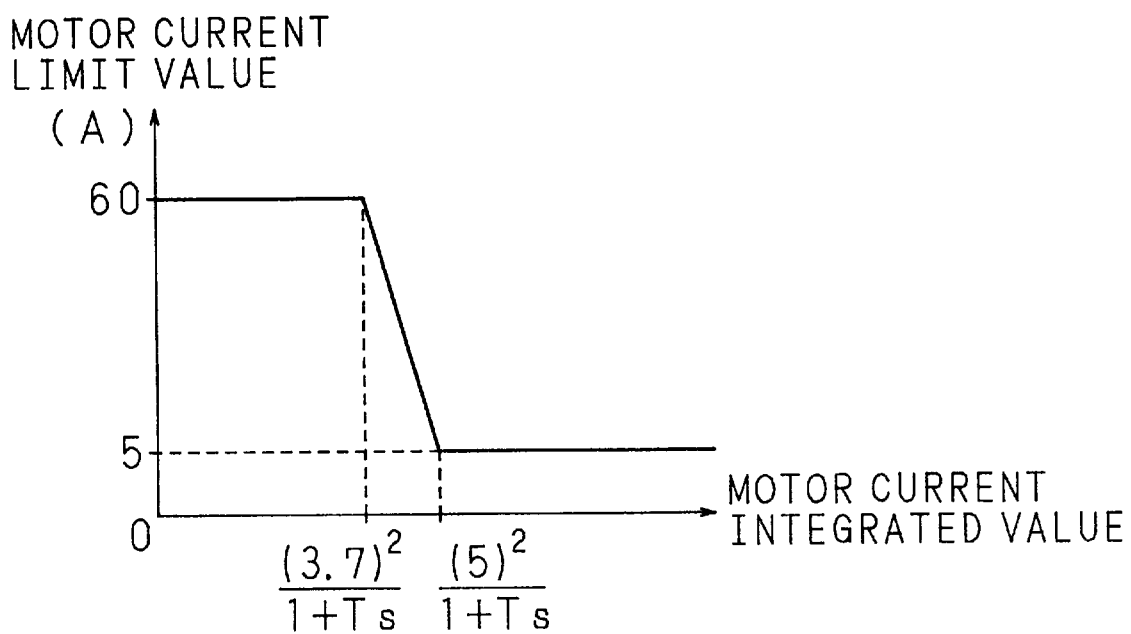
FIG. 2 is an explanatory diagram for showing an upper limit value of a driving current for an electric motor determined by a protecting section.
Figure 3:
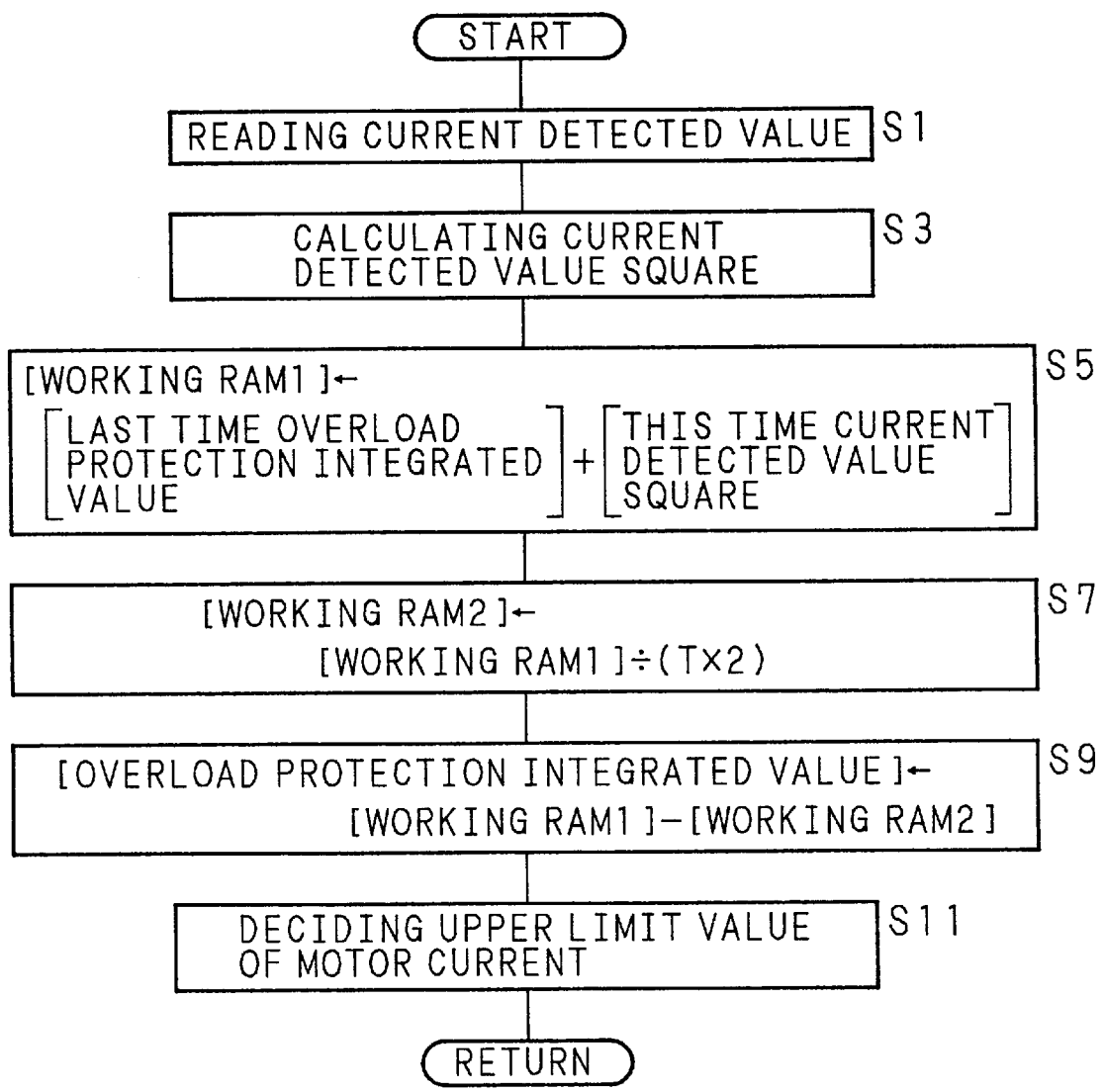
FIG. 3 is a flowchart for showing the operation of the conventional electric power steering apparatus.

FIG. 2 shows an example of the upper limit value of the driving current for the electric motor 5 determined by the protecting section 36a. In FIG. 2, the abscissa indicates an integrated value of the driving current (overload protection integrated value), namely, (driving current)$^2$/(1+Ts), wherein s indicates a Laplacean and T indicates a time constant depending upon a temperature increase characteristic of a transistor of the motor driving circuit. For example, $T=T_1=16384$ seconds (adopted when the overload protection integrated value is increased) and $T=T_2=1000$ seconds (adopted when the overload protection integrated value is decreased). The ordinate indicates the upper limit value.

The integrated value indicates a value of primary delay corresponding to temperature increase caused by an exothermal amount expressed by a square of the current and the accompanied heat radiation amount, and simulates the temperature increase characteristic of the transistor of the motor driving circuit 4. As is obvious from FIG. 2, when the integrated value exceeds a predetermined value, $(3.7)^2/(1+Ts)$, the upper limit value is decreased from 60A, that is, a rated value.

Figure 5:
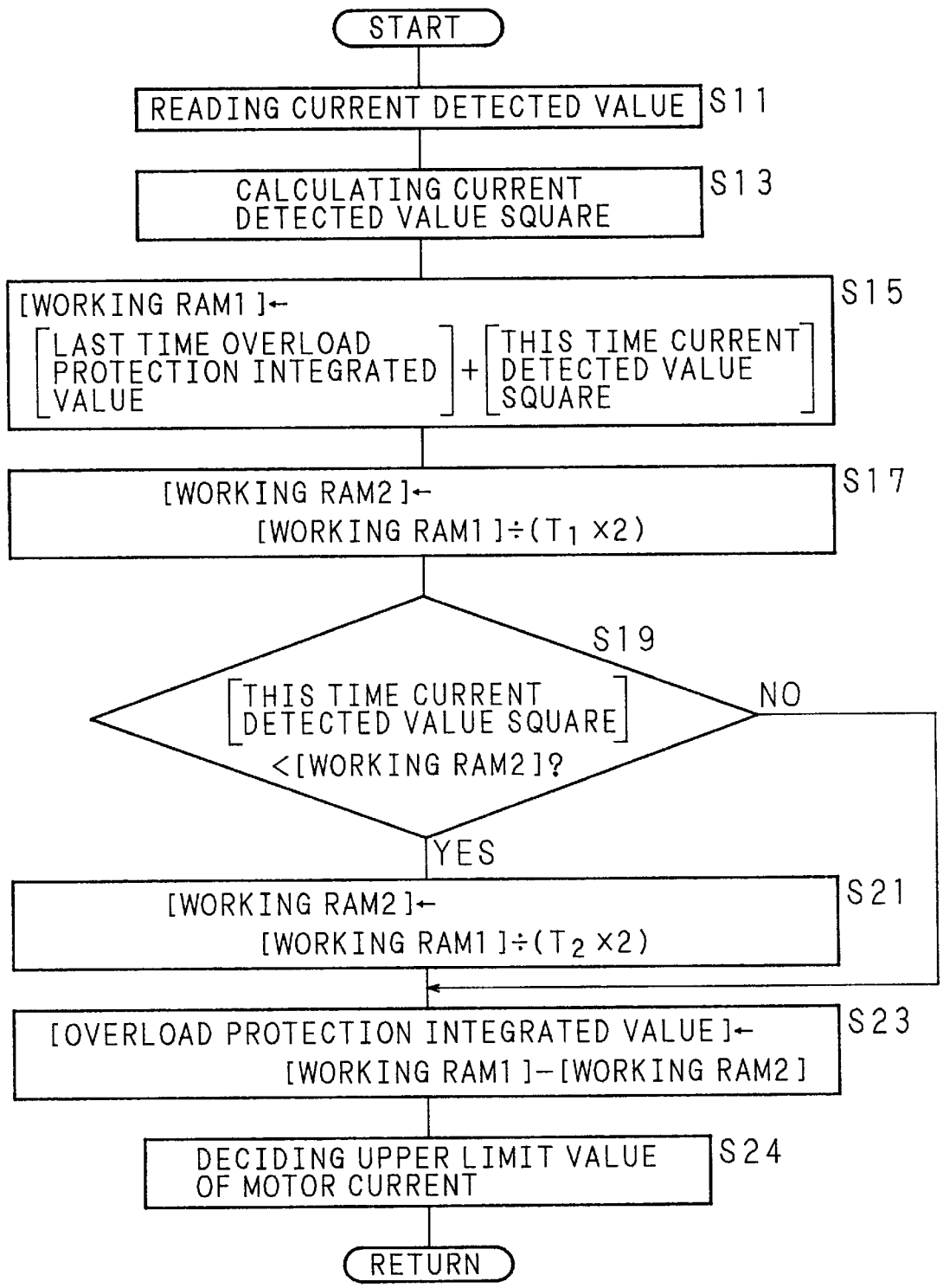
FIG. 5 is a flowchart for showing the operation of the electric power steering apparatus of the invention.

Now, the operation of the protecting section 36a for determining the upper limit value of the driving current for the electric motor 5 will be described with reference to a flowchart for showing the operation shown in FIG. 5.

First, the protecting section 36a reads a current value detected by the current detecting element 6 (step S11) and calculates a square of the detected current value (step S13). Then, the square of this detected current value is added to an overload protection integrated value obtained in previous sampling, and the result of this addition is stored in a working RAM 1 (step S15).

Next, the protecting section 36a divides the content of the working RAM 1 by the time constant $T_1$ adopted when the overload protection integrated value is increased, multiplies the obtained quotient by a sampling cycle (for example, 0.5 second), and stores the obtained product, as a value of primary delay, in a working RAM 2 (step S17).

Subsequently, the protection section 36a compares, by using increase/decrease judging means, the square of the currently detected current value with the content of the working RAM 2 (step S19). When the square of the currently detected current value is smaller, the content of the working RAM 1 is divided by the time constant $T_2$ adopted when the overload protection integrated value is decreased, which is smaller than the time constant $T_1$ adopted when the overload protection integrated value is increased. The quotient resulting from the division is multiplied by the sampling cycle (for example, 0.5 second). Then the protection section 36a stores the obtained product, as a new value of primary delay, in the working RAM 2 (step S21).

When the square of the currently detected current value is larger than the content of the working RAM 2, the content of the working RAM 2 is not changed but retained (step S19).

Next, the protecting section 36a subtracts the content of the working RAM 2 from the content of the working RAM 1, and defines the obtained difference as an overload protection integrated value (step S23). Then, on the basis of this overload protection integrated value, the protecting section 36 determines the upper limit value of the motor current based on a table (not shown) listing the characteristic as is shown in FIG. 2 (step S24), and the procedure is returned.

In comparison of an overload protection integrated value obtained in current sampling and an overload protection integrated value obtained in previous sampling, when the currently detected current value is indicated as I and the overload protection integrated value obtained in the previous sampling is indicated as P, the overload protection integrated value obtained in the current sampling is $P+I^2-(P+I^2)/(T_1 \times 2)$. Therefore, when $P+I^2-(P+I^2)/(T_1 33\ 2)$ is smaller than P, $I^2<(P+I^2)/(T_1\times 2)$, namely, the square of the currently detected current value is smaller than the content of the working RAM 2.

According to the electric power steering apparatus of this invention, the upper limit value of a motor current, which is decreased in accordance with increase of a value of primary delay for overheat protection of a motor driving circuit, can be rapidly increased when the value of primary delay tends to decrease. As a result, the steering power can be rapidly recovered.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An electric power steering apparatus, comprising:
    a motor driving circuit for driving an electric motor for assisting a steering power;
    a detecting element for detecting a driving current for the electric motor; and
    an overheat protecting means for deciding an allowable upper limit value of the driving current for the electric motor on the basis of the detected driving current,
    wherein the overheat protecting means includes:
        means for calculating a square of the detected driving current;
        means for obtaining a value of primary delay of temperature increase in the motor driving circuit on the basis of the calculated square and a set time constant;
        increase/decrease judging means for judging whether or not the obtained value of primary delay tends to decrease;
        means for obtaining, when the increase/decrease judging means judges that the value of primary delay tends to decrease, a new value of primary delay with the time constant set at a smaller value than when it is not judged that the value of primary delay tends to decrease; and
        means for deciding the allowable upper limit value of the driving current for the electric motor on the basis of the obtained new value of primary delay.

2. The electric power steering apparatus according to claim 1,
    wherein the increase/decrease judging means compares the square of the detected driving current value with the value of primary delay and judges that the value of primary delay tends to decrease when the square is smaller than the value of primary delay.

3. The electric power steering apparatus according to claim 1,
    wherein the value of primary delay is obtained by dividing a sum of an integrated value of the detected driving current and the square of the detected driving current by the set time constant.

4. The electric power steering apparatus according to claim 1,
    wherein the overheat protecting means decides the allowable upper limit value of the driving current for the electric motor on the basis of a value obtained by subtracting the value of primary delay from a sum of an integrated value of the detected driving current and the square of the detected driving current.

5. The electric power steering apparatus according to claim 2,
    wherein the value of primary delay is obtained by dividing a sum of an integrated value of the detected driving current and the square of the detected driving current by the set time constant.

6. The electric power steering apparatus according to claim 2,
    wherein the overheat protecting means decides the allowable upper limit value of the driving current for the electric motor on the basis of a value obtained by subtracting the value of primary delay from a sum of an integrated value of the detected driving current and the square of the detected driving current.

7. The electric power steering apparatus according to claim 3,
    wherein the overheat protecting means decides the allowable upper limit value of the driving current for the electric motor on the basis of a value obtained by subtracting the value of primary delay from a sum of an integrated value of the detected driving current and the square of the detected driving current.

* * * * *